(12) United States Patent
Huynh (10) Patent No.: US 8,660,213 B1
(45) Date of Patent: Feb. 25, 2014

(54) BANDPASS-SAMPLING WIDE-BAND RECEIVER

(71) Applicant: Phuong Thu-Minh Huynh, Fairfax, VA (US)

(72) Inventor: Phuong Thu-Minh Huynh, Fairfax, VA (US)

( * ) Notice: Subject to any disclaimer, the term of this patent is extended or adjusted under 35 U.S.C. 154(b) by 0 days.

(21) Appl. No.: 13/709,031

(22) Filed: Dec. 9, 2012

(51) Int. Cl.
*H03K 9/06* (2006.01)

(52) U.S. Cl.
USPC .................................................. 375/322

(58) Field of Classification Search
USPC .................................................. 375/322
See application file for complete search history.

(56) References Cited

U.S. PATENT DOCUMENTS

| 2010/0097258 A1* | 4/2010 | Koli ............................ 341/155 |
| 2010/0176991 A1* | 7/2010 | Webber et al. ........... 342/357.12 |
| 2010/0291891 A1* | 11/2010 | Ridgers et al. ............... 455/205 |
| 2010/0301928 A1* | 12/2010 | Barth et al. .................. 327/557 |

* cited by examiner

*Primary Examiner* — Don N Vo
(74) *Attorney, Agent, or Firm* — Phuong Huynh (57) ABSTRACT

A wide-frequency band quadrature bandpass-sampling receiver is provided. An RF signal received at the antenna is amplified by an LNA and filtered by an image-reject filter. The filtered RF signal is then frequency-shifted to an intermediate frequency which is located in between 1 GHz to 4 GHz. A quadrature bandpass-sampling analog-to-digital demodulator down-converts and digitizes the frequency-shifted signal at the intermediate frequency to baseband yielding a bi-level in-phase component and a bi-level quadrature component.

31 Claims, 10 Drawing Sheets

BANDPASS-SAMPLING WIDE-BAND RECEIVER

FIELD OF THE INVENTION

The present invention relates in general to analog-to-digital conversion in communication systems and, more particularly, in a wide-band RF receiver. More specifically, the invention relates to the analog-to-digital demodulation of a signal at radio frequency in a communication system.

BACKGROUND OF THE INVENTION

Wireless systems are becoming a fundamental mode of telecommunication in modern society. In order for wireless systems to continue to penetrate into the telecommunications market, the cost of providing the service must continue to decrease and the convenience of using the service should continue to increase. In response to increasing market demand, radio standards around the world have been proliferated based upon digital modulation schemes. Consequently, it is often advantageous to have a receiver that is capable of communication using more than one of these standardized techniques. In order to do so, it is necessary to have a receiver that is capable of receiving signals that have been modulated according to several different modulation techniques.

Existing receivers are implemented using double conversion (or heterodyne) receiver architectures. A double conversion receiver architecture is characterized in that a received radio-frequency (RF) signal is converted to an intermediate frequency (IF) signal, which is subsequently converted to baseband. In addition, gain control is also typically applied at the IF. However, double conversion receivers have the disadvantage of utilizing a great number of analog circuit components, thus, increasing the cost, size, and power consumption of the receiver.

A direct conversion receiver, also sometimes called a zero-IF receiver, provides an alternative to the traditional double down conversion architecture. This is particularly attractive for the use in wireless systems, especially in handsets, since direct conversion receivers lend themselves more easily to monolithic integration than heterodyne architectures. Also, direct conversion exhibits immunity to the problem of image since there is no IF.

However, there are design issues associated with the direct conversion architecture. The most serious problem is a direct current (DC) offset in the baseband, which appears in the middle of the down-converted signal spectrum, and may be larger than the signal itself. This phenomenon is caused by local oscillator leakage and self-mixing. Furthermore, I/Q mismatch, occurring in the quadrature down-conversion, can lead to corrupted signal constellation, thereby increasing the number of bits in error, due to the differences which may occur in the I and Q signal amplitudes.

SUMMARY OF THE INVENTION

This invention features a circuit for demodulating and digitizing an RF signal over a wide-frequency band, comprising: an antenna configured to produce an RF signal; a low-noise amplifier (LNA) configured to receive the RF signal to produce an amplified RF signal; a filter, responsive to the LNA, configured to remove an image frequency of the amplified RF signal, thereby generating a filtered RF signal; a first local oscillator configured to generate a first mixing signal having a first mixing frequency; a first mixer configured to frequency-shift the filtered RF signal based on the first mixing frequency, thereby producing a frequency-shifted RF signal located at an intermediate frequency; a sampling clock generator configured to generate a first sampling clock, a first in-phase sampling clock, a first quadrature sampling clock, a second in-phase sampling clock, and a second quadrature sampling clock; a first summer configured to generate a first error signal by subtracting a first up-converting quadrature analog signal and a first up-converting in-phase analog signal from the frequency-shifted signal; a first resonator configured to receive the first error signal and to generate an amplified first error signal; a second summer configured to generate a second error signal by subtracting a second up-converting quadrature analog signal and a second up-converting in-phase analog signal from the amplified first error signal; a second resonator configured to receive the second error signal, and to generate an amplified second error signal; a second local oscillator configured to generate a second mixing signal having a second mixing frequency; a second mixer configured to frequency-shift the amplified second error signal based on the second mixing frequency to generate a frequency-shifted error signal; a third summer configured to generate a third error signal by subtracting a third up-converting quadrature analog signal and a third up-converting in-phase analog signal from the frequency-shifted error signal; a third resonator configured to receive the third error signal, and to generate an amplified third error signal; a fourth summer configured to generate a fourth error signal by subtracting a fourth up-converting quadrature analog signal and a fourth up-converting in-phase analog signal from the amplified third error signal; a fourth resonator configured to receive the fourth error signal, and to generate an amplified fourth error signal; a quadrature quantizer configured to sample the amplified fourth error signal based on the first quadrature sampling clock, and to generate a quadrature digital signal; an in-phase quantizer configured to sample the amplified fourth error signal based on the first in-phase sampling clock and to generate an in-phase digital signal; a first quadrature digital mixer configured to frequency-shift the quadrature digital signal based on the first quadrature sampling clock to generate a first up-converting quadrature digital signal; a first in-phase digital mixer configured to frequency-shift the in-phase digital signal based on the first in-phase sampling clock to generate a first up-converting in-phase digital signal; a second quadrature digital mixer configured to frequency-shift the quadrature digital signal based on the second quadrature sampling clock to generate a second up-converting quadrature digital signal; a second in-phase digital mixer configured to frequency-shift the in-phase digital signal based on the second in-phase sampling clock to generate a second up-converting in-phase digital signal; a first quadrature D/A configured to generate the first up-converting quadrature analog signal, responsive to the second up-converting quadrature digital signal; a second quadrature D/A configured to generate the second up-converting quadrature analog signal, responsive to the second up-converting quadrature digital signal; a third quadrature D/A configured to generate the third up-converting quadrature analog signal, responsive to the first up-converting quadrature digital signal; a fourth quadrature D/A configured to generate the fourth up-converting quadrature analog signal, responsive to the first up-converting quadrature digital signal; a first in-phase D/A configured to generate the first up-converting in-phase analog signal, responsive to the second up-converting in-phase digital signal; a second in-phase D/A configured to generate the second up-converting in-phase analog signal, responsive to the second up-converting in-phase digital signal; a third in-phase D/A configured to generate the third up-converting in-phase analog signal, responsive to the first up-converting in-phase digital signal; a fourth in-phase D/A configured to generate the fourth up-converting in-phase analog signal, responsive to the first up-converting in-phase digital signal; and an interface circuit configured to generate a plurality of in-phase low-voltage differential signaling (LVDS) signals responsive to the in-phase digital signal, generate a plurality of quadrature LVDS signals responsive to the quadrature digital signal, and generate an LVDS clock responsive to the first sampling clock.

The LNA is a wide band amplifier covering frequencies from 400 MHz to 6 GHz. When a frequency of the RF signal is below the intermediate frequency, the filter is a low-pass filter. On the other hand, when a frequency of the RF signal is higher than the intermediate frequency, the filter is a high-pass filter. Also, the intermediate frequency is between 1 GHz and 4 GHz; and the first mixing frequency is equal to the difference between the RF signal frequency and the intermediate frequency.

In the above circuit, the first quadrature sampling clock is ninety degree out of phase with the first in-phase sampling clock. The second quadrature sampling clock is ninety degree out of phase with the second in-phase sampling clock. A first clock frequency of the first in-phase sampling clock and the first quadrature sampling clock is equal to a sampling clock frequency of the first sampling clock, and a second clock frequency of the second in-phase sampling clock and the second quadrature sampling clock is equal to the intermediate frequency.

Also, a first resonant frequency of the first resonator and a second resonant frequency of the second resonator are both approximately equal to the intermediate frequency. A third resonant frequency of the third resonator is approximately equal to a fourth resonant frequency of the fourth resonator. The third resonant frequency and the fourth resonant frequency are both half of the intermediate frequency, and a first clock frequency of the first in-phase sampling clock and the first quadrature sampling clock is half of the intermediate frequency.

The above circuit can also features a third resonant frequency of the third resonator is approximately equal to a fourth resonant frequency of the fourth resonator. The third resonant frequency and the fourth resonant frequency are both twice the intermediate frequency, and a first clock frequency of the first in-phase sampling clock and the first quadrature sampling clock is twice the intermediate frequency.

In the above circuit, the in-phase digital signal and quadrature digital signal are both bi-level signals.

Also, the interface circuit further comprises: a serial-to-parallel converter configured to capture M consecutive in-phase digital signals from the in-phase quantizer to produce M parallel in-phase digital signals, and to capture M consecutive quadrature digital signals from the quadrature quantizer to produce M parallel quadrature digital signals; a clock divider configured to divide the first sampling clock by M to generate a divide-by-M clock; an LVDS interface circuit configured to receive the M parallel in-phase digital signals to generate M parallel in-phase LVDS signals, to receive the M parallel quadrature digital signals to generate M parallel quadrature LVDS signal, and to receive the divide-by-M clock to generate an LVDS clock.

The interface circuit can have a first mode in which a period of the in-phase LVDS signal is equal to a period of the LVDS clock, a period of the quadrature LVDS signal is equal to the period of the LVDS clock, and a rising edge of the LVDS clock coincides with transition edges of the in-phase LVDS signals and the quadrature LVDS signals.

Also, the interface circuit can have a second mode in which a period of the in-phase LVDS signal is equal to half a period of the LVDS clock, a period of the quadrature LVDS signal is equal to half the period of the LVDS clock, and rising and falling edges of the LVDS clock coincide with transition edges of the in-phase LVDS signal and the quadrature LVDS signal.

The interface circuit can have a third mode in which a period of the in-phase LVDS signal is equal to a period of the LVDS clock, a period of the quadrature LVDS signal is equal to the period of the LVDS clock, and a falling edge of the LVDS clock coincides with transition edges of the in-phase LVDS signal and the quadrature LVDS signal.

The interface circuit can have a fourth mode in which a period of the in-phase LVDS signal is equal to half a period of the LVDS clock, a period of the quadrature LVDS signal is equal to half the period of the LVDS clock, and transition edges of the LVDS clock are midway between transition edges of the in-phase LVDS signals and the quadrature LVDS signals.

This invention also features a method for demodulating and digitizing an RF signal over a wide-frequency band comprising: receiving an RF signal from the air; amplifying the RF signal to generate an amplified RF signal; filtering the amplified RF signal to remove an image frequency of the amplified RF signal, thereby generating a filtered RF signal; generating a first mixing signal having a first mixing frequency; frequency-shifting the filtered RF signal based on the first mixing signal, thereby producing a frequency-shifted RF signal located at an intermediate frequency; generating a first sampling clock signal, a first in-phase sampling clock signal, a first quadrature sampling clock signal, a second in-phase sampling clock signal, and a second quadrature sampling clock signal; generating a first error signal by subtracting a first up-converting quadrature analog signal and a first up-converting in-phase analog signal from the frequency-shifted signal; generating an amplified first error signal in response to the first error signal; generating a second error signal by subtracting a second up-converting quadrature analog signal and a second up-converting in-phase analog signal from the amplified first error signal; generating an amplified second error signal in response to the second error signal; generating a second mixing signal having a second mixing frequency; frequency-shifting the amplified second error signal based on the second mixing frequency, thereby generating a frequency-shifted error signal; generating a third error signal by subtracting a third up-converting quadrature analog signal and a third up-converting in-phase analog signal from the frequency-shifted error signal; generating an amplified third error signal in response to the third error signal; generating a fourth error signal by subtracting a fourth up-converting quadrature analog signal and a fourth up-converting in-phase analog signal from the amplified third error signal; generating an amplified fourth error signal in response to the fourth error signal; sampling the amplified fourth error signal based on the first quadrature sampling clock signal, thereby generating a quadrature digital signal; sampling the amplified fourth error signal based on the first in-phase sampling clock signal, thereby generating an in-phase digital signal; frequency-shifting the quadrature digital signal based on the first quadrature sampling clock signal to generate a first up-converting quadrature digital signal; frequency-shifting the in-phase digital signal based on the first in-phase sampling clock signal to generate a first up-converting in-phase digital signal; frequency-shifting the quadrature digital signal based on the second quadrature sampling clock signal and generating a second up-converting quadrature digital signal; frequency-shifting the in-phase digital signal based on the second in-phase sampling clock signal and generating a second up-converting in-phase digital signal; producing the first up-converting quadrature analog signal, responsive to the second up-converting quadrature digital signal; producing the second up-converting quadrature analog signal, responsive to the second up-converting quadrature digital signal; producing the third up-converting quadrature analog signal, responsive to the first up-converting quadrature digital signal; producing the fourth up-converting quadrature analog signal, responsive to the first up-converting quadrature digital signal; producing the first up-converting in-phase analog signal, responsive to the second up-converting in-phase digital signal; producing the second up-converting in-phase analog signal, responsive to the second up-converting in-phase digital signal; producing the third up-converting in-phase analog signal, responsive to the first up-converting in-phase digital signal; producing the fourth up-converting in-phase analog signal, responsive to the first up-converting in-phase digital signal; generating a plurality of in-phase low-voltage differential signaling (LVDS) signals responsive to the in-phase digital signal; generating a plurality of quadrature LVDS signals responsive to the quadrature digital signal; generating an LVDS clock signal responsive to the first sampling clock signal.

In the above method, the amplifying of the RF signal covers frequencies from 400 MHz to 6 GHz. The filtering of the amplified RF signal is low-pass filtering, if a frequency of the RF signal is below the intermediate frequency. The filtering of the amplified RF signal is high-pass filtering, if a frequency of the RF signal is higher than the intermediate frequency. The intermediate frequency is between 1 GHz and 4 GHz; and the first mixing frequency is equal to the difference between the RF signal frequency and the intermediate frequency.

In the above method, the first quadrature sampling clock is ninety degree out of phase with the first in-phase sampling clock and the first quadrature sampling clock are ninety degree out of phase, the second quadrature sampling clock is ninety degree out of phase with the second in-phase sampling clock, a first clock frequency of the first in-phase sampling clock and the first quadrature sampling clock is equal to a sampling clock frequency of the first sampling clock, and a second clock frequency of the second in-phase sampling clock and the second quadrature sampling clock is equal to the intermediate frequency.

Furthermore, in the above method, the generating of the amplified first error signal is in response to the first error signal and a first resonant frequency; the generating of the amplified second error signal is in response to the second error signal and a second resonant frequency; the generating of the amplified third error signal is in response to the third error signal and a third resonant frequency; and the generating of the amplified fourth error signal is in response to the fourth error signal and a fourth resonant frequency.

The first resonant frequency and the second resonant frequency are both approximately equal to the intermediate frequency. The third resonant frequency is approximately equal the fourth resonant frequency, the third resonant frequency and the fourth resonant frequency are both half of the intermediate frequency, a first clock frequency of the first in-phase sampling clock signal and the first quadrature sampling clock signal is half of the intermediate frequency.

The above method can also feature the followings: the third resonant frequency is approximately equal the fourth resonant frequency, the third resonant frequency and the fourth resonant frequency are both twice the intermediate frequency, a first clock frequency of the first in-phase sampling clock signal and the first quadrature sampling clock signal is twice the intermediate frequency.

In the above method, the in-phase digital signal and quadrature digital signal are both bi-level signals.

Furthermore, the interface circuit further comprises: capturing M consecutive in-phase digital signals to produce M parallel in-phase digital signals; capturing M consecutive quadrature digital signals to produce M parallel quadrature digital signals; dividing the first sampling clock signal by M to generate a divide-by-M clock signal; generating M parallel in-phase LVDS signals based on the M parallel in-phase digital signals; generating M parallel quadrature LVDS signal the M parallel quadrature digital signals; and generating an LVDS clock signal based on the divide-by-M clock signal.

The interface circuit can have a first mode in which a period of the in-phase LVDS signal is equal to a period of the LVDS clock signal, a period of the quadrature LVDS signal is equal to the period of the LVDS clock signal, and a rising edge of the LVDS clock signal coincides with transition edges of the in-phase LVDS signals and the quadrature LVDS signals.

The interface circuit can have also have a second mode in which a period of the in-phase LVDS signal is equal to half a period of the LVDS clock signal, a period of the quadrature LVDS signal is equal to half the period of the LVDS clock signal, and rising and falling edges of the LVDS clock signal coincide with transition edges of the in-phase LVDS signal and the quadrature LVDS signal.

The interface circuit can also have a third mode in which a period of the in-phase LVDS signal is equal to a period of the LVDS clock signal, a period of the quadrature LVDS signal is equal to the period of the LVDS clock signal, and a falling edge of the LVDS clock signal coincides with transition edges of the in-phase LVDS signal and the quadrature LVDS signal.

The interface circuit can also have a fourth mode in which a period of the in-phase LVDS signal is equal to half a period of the LVDS clock signal, a period of the quadrature LVDS signal is equal to half the period of the LVDS clock signal, and transition edges of the LVDS clock signal are midway between transition edges of the in-phase LVDS signals and the quadrature LVDS signals

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

In overview, the present disclosure concerns electronic devices or units, some of which are referred to as communication units, such as cellular telephones or two-way radios and the like, typically having a capability for rapidly handling data, such as can be associated with a communication system such as an Enterprise Network, a cellular Radio Access Network, or the like. More particularly, various inventive concepts and principles are embodied in circuits, and methods therein for receiving signals in connection with a communication unit.

The instant disclosure is provided to further explain, in an enabling fashion, the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with in integrated circuits (ICs), such as a digital signal processor or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Figure 1A:
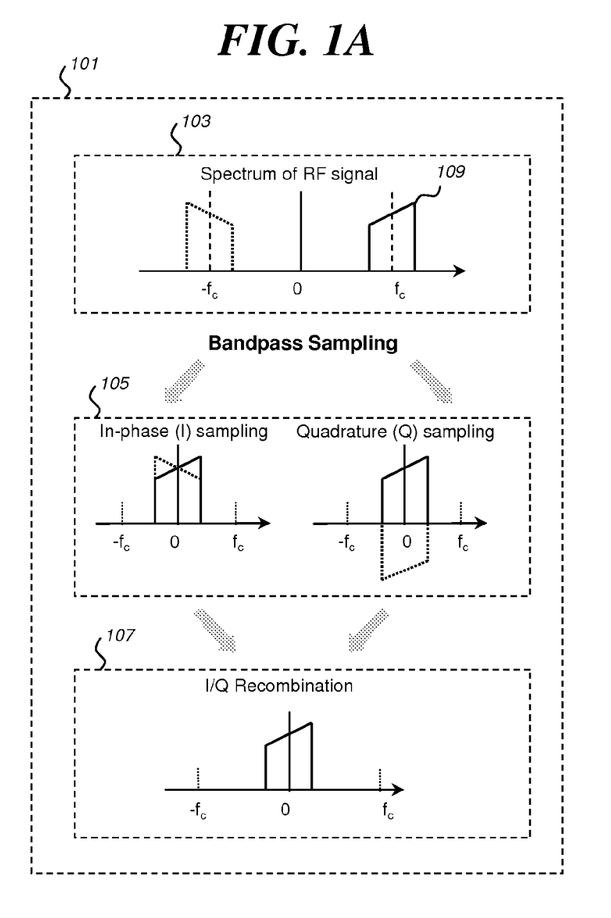
FIG. 1A is a frequency diagram illustrating down-conversion to baseband based on the bandpass-sampling theory.
Figure 1B:
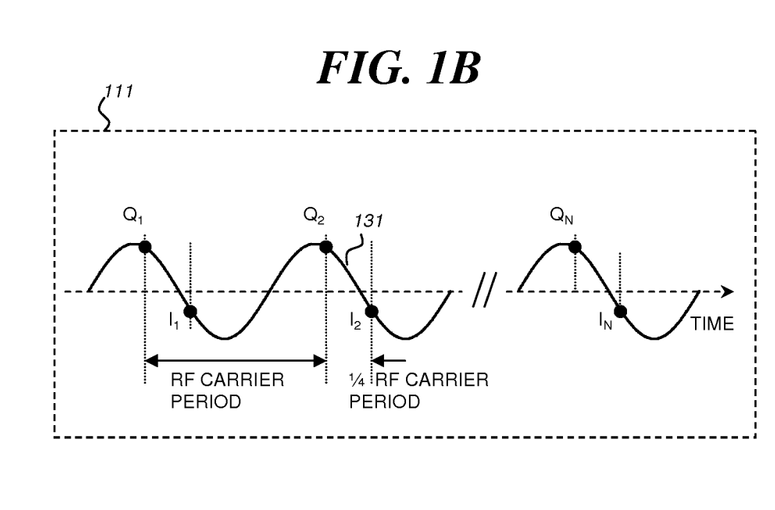
FIG. 1B is a timing diagram illustrating down-conversion to baseband based on the bandpass-sampling theory.

Referring now to FIGS. 1A and 1B, a frequency diagram 101 and timing diagram 111 are provided, illustrating down-conversion of an RF signal to baseband based on the bandpass-sampling theory. A communication transmitter is employed to modulate information to a carrier frequency $f_C$, and to transmit the RF signal over the air. For example, conventional cellular phone carrier frequencies are currently set at either 900 MHz or 1800 MHz. In the frequency domain, the transmitted information 109 in frequency diagram 103 can be seen centered at the carrier frequency $f_C$, where the width of the shaped object corresponds to the bandwidth of the transmitted information. Note that the transmitted object is mirrored to the negative frequencies around the zero-frequency axis.

The timing diagram 111 illustrates a sinusoidal waveform 131 generated at the RF carrier frequency. The in-phase and quadrature signals which carry the communicating information slowly modulate the amplitude and/or the phase of the sinusoidal waveform 131, depending on the modulation scheme employed in the communication system. In a quadrature bandpass-sampling receiver, the sampling rate is set equal to the RF carrier frequency, $f_C$, and only two respective sampled data points (I & Q) are provided every period of the RF carrier, as shown in the timing diagram 111. The first sequence of sampled data points $I_1, I_2, \ldots, I_N$ corresponds to the in-phase (I) sequence while the second sequence of sampled data points $Q_1, Q_2, \ldots, Q_N$ corresponds to the quadrature (Q) sequence. Note that the time duration in between adjacent sampled points of each sequence is always, $1/f_C$, the RF carrier period, and the time duration between an Q sampled point and an adjacent I sampled point is always, $1/4f_C$, or one-quarter of the RF carrier period.

Bandpass sampling the sinusoidal waveform 131 removes the high frequency RF waveform and retains only the slowly-varying amplitude and/or phase of the communicating information that was modulated onto the RF carrier. By virtue of the bandpass sampling theory, the in-phase and quadrature modulated signals are down-converted to baseband, or DC, as illustrated in the frequency diagram 105 of FIG. 1A. The sampled I and Q sequences can be recombined to re-construct the transmitted quadrature signals as illustrated in the frequency diagram 107.

Referring now to FIGS. 2A-2D, a schematic diagram and related frequency diagrams are provided, illustrating an exemplary wide-frequency-band quadrature bandpass-sampling RF receiver, according to disclosed embodiments.

Figure 2A:
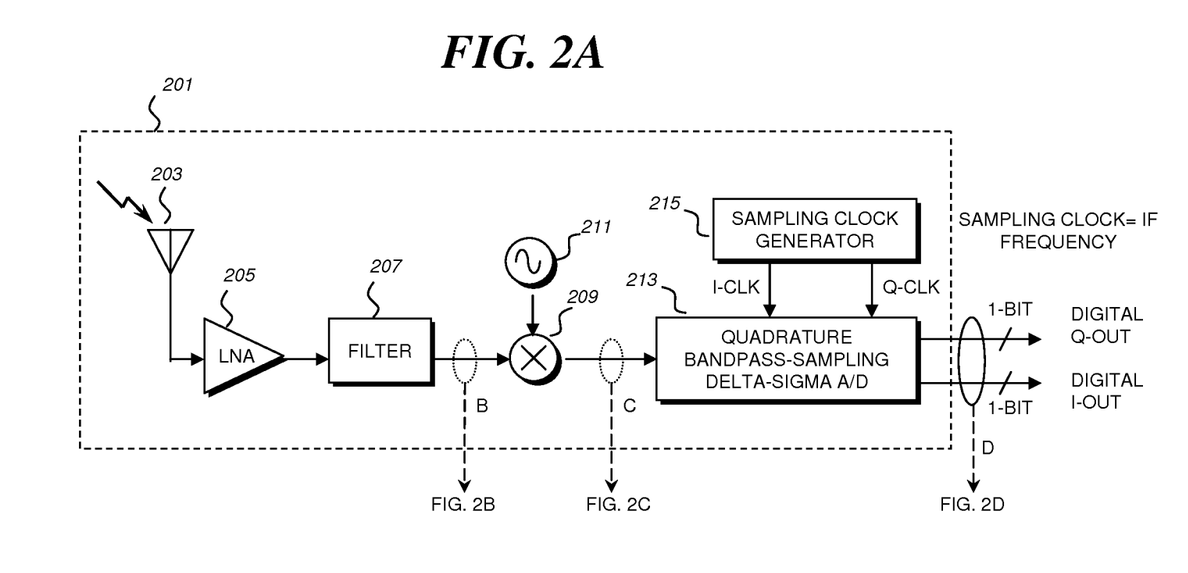
FIG. 2A is a schematic diagram illustrating an exemplary wide-frequency-band quadrature bandpass-sampling RF receiver according to disclosed embodiments.
Figure 2B:
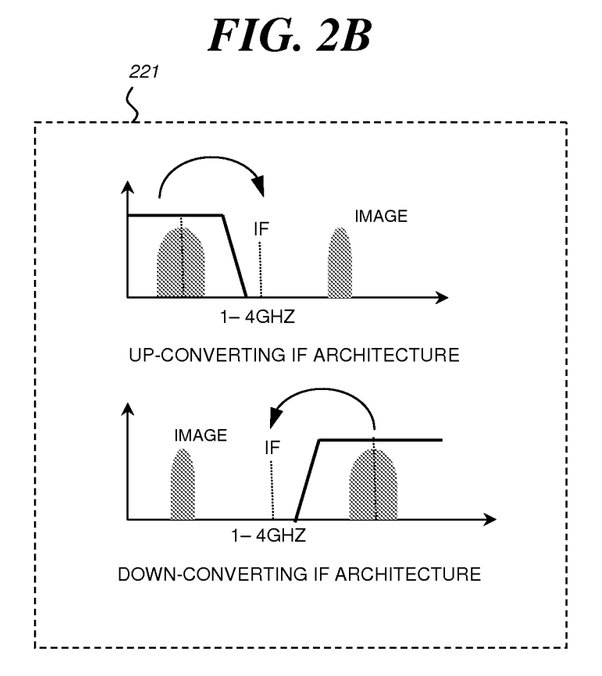
FIG. 2B is a frequency diagram illustrating modes of frequency shifting of the exemplary wide-frequency-band quadrature bandpass-sampling RF receiver according to disclosed embodiments.
Figure 2C:
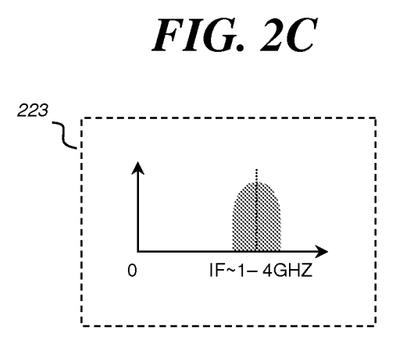
FIG. 2C is a frequency diagram illustrating IF conversion of the exemplary wide-frequency-band quadrature bandpass-sampling RF receiver according to disclosed embodiments.
Figure 2D:
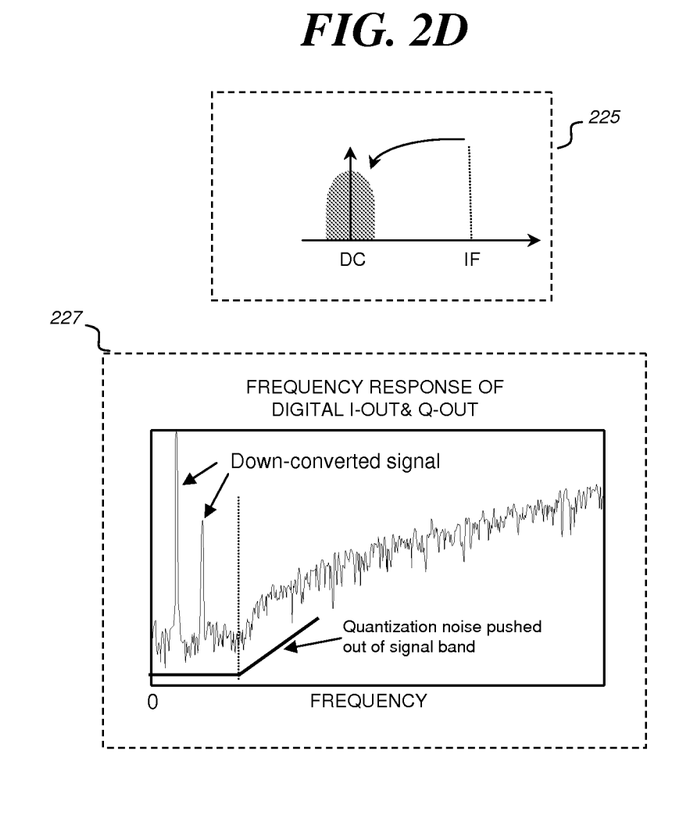
FIG. 2D is a frequency diagram illustrating conversion to baseband of the exemplary wide-frequency-band quadrature bandpass-sampling RF receiver according to disclosed embodiments.

As shown in FIG. 2A, the exemplary wide-frequency band quadrature bandpass-sampling delta-sigma receiver 201 includes an antenna 203, a low-noise amplifier (LNA) 205, a filter 207, a mixer 209, a local oscillator 211, a sampling clock generator 215, and a quadrature bandpass-sampling delta sigma analog-to-digital demodulator (QBS-ADD) 213. As shown in FIGS. 2B-2D, the frequency diagrams 221, 223, 225, and 227 illustrate the frequency shifting and demodulation of the RF signal at various stages in the receiver. These stages are marked B, C, and D in the diagram of FIG. 2A.

The antenna 203 receives an RF signal, which is amplified by the LNA 205 and processed through the filter 207. The purpose of the filter 207 is to remove the image of the RF signal before frequency shifting the RF signal to the intermediate frequency (IF), which is usually set between 1 GHz to 4 GHz. In various embodiments, the filter 207 can be either a low-pass filter or a high-pass filter. As shown in the frequency diagram 221 of FIG. 2B, for an up-converting IF architecture, in which the RF signal is located below the IF frequency, the filter 207 is a low-pass filter, and is used to remove the image component above the IF frequency. In this case, the cut-off frequency of the low-pass filter 207 must be set below the IF frequency. On the other hand, as also shown in the frequency diagram 221 of FIG. 2B, for a down-converting IF architecture, in which the RF signal is located above the IF frequency, the filter 207 is a high-pass filter, and is used to remove the image component below the IF frequency. In this case, the cut-off frequency of the high-pass filter must be set above the IF frequency.

The filtered RF signal at the output of the filter 207 is mixed with the output of the local oscillator 211 by the mixer 209 in order to frequency shift the filtered RF signal to the IF frequency. The frequency of the oscillator 211 is set to be the difference between the IF frequency and the RF signal frequency. As shown in the frequency diagram 223 of FIG. 2C, the RF signal is frequency-translated to the center of the IF frequency by the mixer 209.

The frequency-translated RF signal, which is now located at the IF frequency, is bandpass-sampled by the QBS-ADD based on an in-phase clock I-CLK and a quadrature clock Q-CLK, which are generated by the sampling clock generator 215. As discussed in FIG. 1B, the in-phase clock and the quadrature clock are separated from each other by ninety degrees. The communicating in-phase and quadrature information embedded in the RF signal is demodulated to baseband by the in-phase clock I-CLK and the quadrature clock Q-CLK, respectively, and corresponding digital I-OUT and Q-OUT signals are generated. The frequency diagram 225 of FIG. 2D illustrates the signal demodulation to baseband from the IF frequency by the QBS-ADD 213.

Unlike conventional RF receivers, where the in-phase and quadrature demodulated signals are digitized by a pair of A/Ds at high-resolution and low sampling rate, the QBPS-ADD 213 is a delta-sigma type converter, which produces a stream of bi-level digital I-OUT and Q-OUT signals that are clocked at a sample rate equal to the IF frequency. The frequency diagram 227 of FIG. 2D illustrates the spectrum profile of typical I-OUT and Q-OUT signals. As shown in FIG. 2D, even though the QBS-ADD has 1-bit resolution, the quantization noise is pushed out of the signal band, thereby yielding high-resolution I-OUT and Q-OUT signals.

Figure 3:
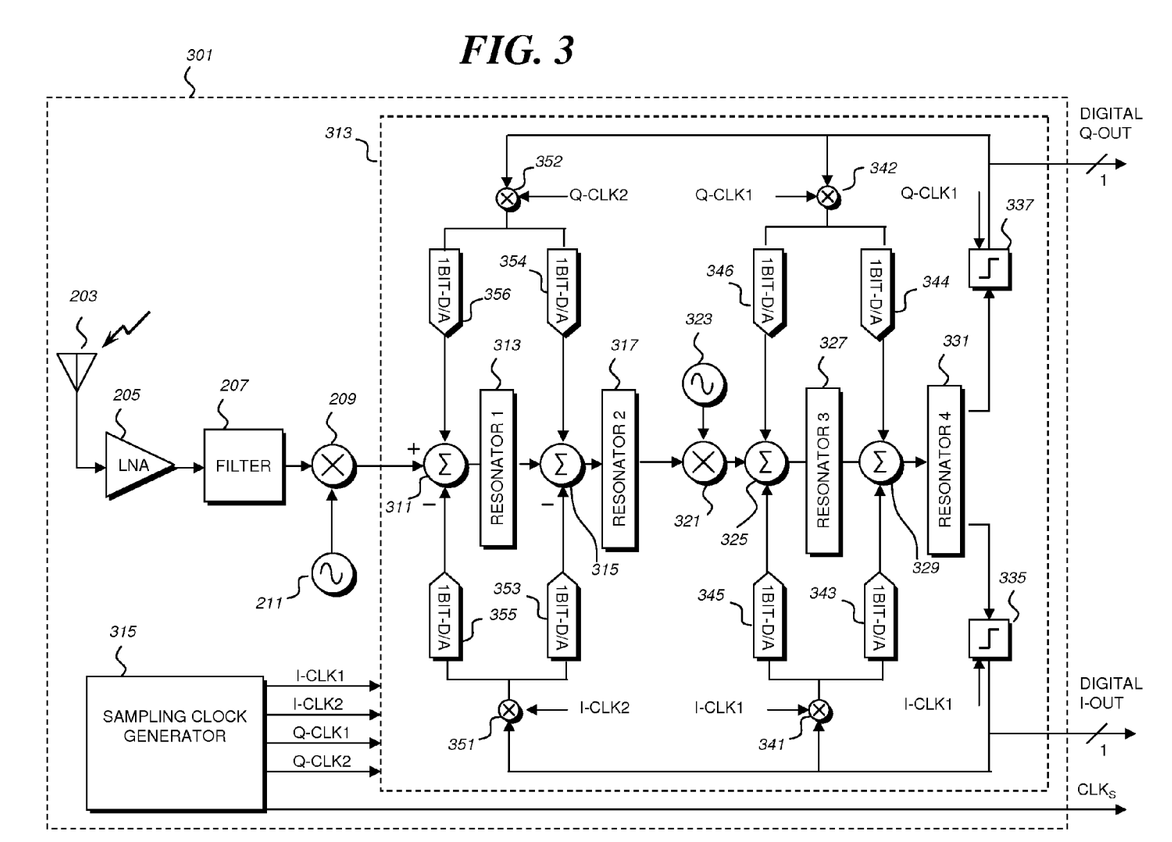
FIG. 3 is a schematic diagram illustrating an exemplary wide-frequency-band quadrature bandpass-sampling RF receiver according to disclosed embodiments.

Referring now to FIG. 3, a schematic diagram is provided, illustrating an exemplary wide-frequency band quadrature bandpass-sampling RF receiver 301, according to disclosed embodiments. As shown in FIG. 3, the wide-frequency band quadrature bandpass-sampling RF receiver 301 comprises an LNA 205, a filter 207, a mixer 209, a first local oscillator 211, a sampling clock generator 315, and a QBS-ADD 313. The QBS-ADD 313 further comprises a plurality of summers 311, 315, 325, and 329; an analog mixer 321, a second local oscillator 321, a plurality of digital mixers 341, 342, 351, and 352; a plurality of 1-bit digital-to-analog converters (D/A) 343, 344, 345, 346, 353, 354, 355, and 356; first through fourth resonators including a first resonator 313, a second resonator 317, a third resonator 327, and a fourth resonator 331; and first and second 1-bit quantizers 335, and 337. In the drawing of FIG. 3, elements corresponding to those in FIG. 2 operate the same and are referred to by the same numbers. Their description will not be repeated below.

The schematic diagram of the QBS-ADD 213 in FIG. 3 shows it to be an $8^{th}$ order bandpass delta-sigma A/D demodulator. The resonators 313, 317, 327, and 331 are high-gain filters providing amplification of the error signals from the summers 311, 315, 325, and 329, respectively. The 1-bit quantizers 335, 337 sample the output of the fourth resonator 331, and provide the 1-bit digital I-OUT and 1-bit digital Q-OUT, respectively. The quantizers 335 and 337 are clocked by two quadrature clocks I-CLK1 and Q-CLK1, which are ninety degrees out of phase with each other, and whose frequencies are set to be equal to the resonant frequency of the fourth resonator 331, thereby providing demodulation of the RF signal to baseband by virtue of the bandpass-sampling theory.

The analog mixer 321 is provided in the resonator filtering path to avoid the "resonance pulling" effect. In general, in typical bandpass delta-sigma A/Ds, the resonators are required to have high gains and high Q-factors with resonant frequencies set near the IF frequency of the output of the mixer 209. These resonators are typically constructed using LC resonators. At such RF frequency, the high-gain and high-Q-factor often result in an effect known as "resonance pulling," in which these resonant frequencies are pulled toward each other. The pulling effect can be seen as additional undesirable coupling paths between the resonators causing the bandpass delta-sigma A/D to become unstable and inoperable. In the circuit of FIG. 3, the analog mixer 321 and the clock generator 323 operate to frequency shift the amplified error signal from the second resonator 317 to another frequency location. This means that the first resonator 313 and the second resonator 317 have the same resonant frequency that is equal to the IF frequency, while the third resonator 327 and the fourth resonator 331 co-locate in a different frequency region. To simplify hardware implementation, the resonant frequencies of the fourth resonator 331 and the third resonator 327 are set at either half of the IF frequency or twice the IF frequency. Experimental data have shown that resonance pulling is negligible in groups of two resonances; thereby eliminating its effect on the operation of the QBS-ADD 213.

Bandpass-sampling of the RF signal leads to the inclusion of digital mixers in the feedback path. The quadrature quantizers 335 and 337 bandpass-sample and demodulate the RF signal carried by the fourth resonator 331 to baseband into the signals I-OUT and Q-OUT, respectively. Therefore, it is fundamentally necessary to up-convert in frequency the demodulated outputs, Q-OUT and I-OUT, as feedback signals to fulfill the feedback requirement—i.e. the feedback signals must be modulated by the same frequency that carries the signal in the resonator stages so that the correct error signal can be generated at the summing junctions 311, 315, 325 and 329. This requirement dictates the inclusion of the feedback mixers 341, 351 with the up-converting clocks I-CLK1 and I-CLK2, respectively; and the inclusion of the feedback mixers 342, 352 with the up-converting clocks Q-CLK1 and Q-CLK2, respectively, to up-convert the signals I-OUT and Q-OUT, respectively, to the proper frequencies allocated in the first resonant frequency group (the fourth resonator 331 and the third resonator 327), and in the second resonant frequency group (the second resonator 317 and the first resonator 313), respectively.

The sampling clock generator 315 provides the first sampling clock $CLK_S$ the first in-phase and quadrature clocks I-CLK1 and Q-CLK1, and the second in-phase and quadrature clocks I-CLK2 and Q-CLK2, for the QBS-ADD 213. The first in-phase and quadrature clocks I-CLK1 and Q-CLK1 are ninety degrees out of phase with each other; the second in-phase and quadrature clocks I-CLK2 and Q-CLK2 are ninety degrees out of phase with each other; and the clock frequency of the first in-phase and quadrature clocks I-CLK1, Q-CLK1 is preferably either twice or half of the clock frequency of the second in-phase and quadrature clocks I-CLK2, Q-CLK2, depending on whether the resonant frequency of the first group (resonators 327 and 331) is set at twice or half the resonant frequency of the second group (resonators 313 and 317), respectively. The first sampling clock $CLK_s$ is synchronous with the signals I-OUT and Q-OUT, and can be used to latch the signals I-OUT and Q-OUT by a digital signal processor for further data processing.

Thus, the addition of the analog mixer 321 in the resonator filtering path and the digital mixers 341, 342, 351 and 352 in the feedback paths allow for the bandpass-sampling of signals at the RF frequency, which is fundamentally different from the performance of a conventional over-sampling bandpass delta-sigma A/D.

Figure 4:
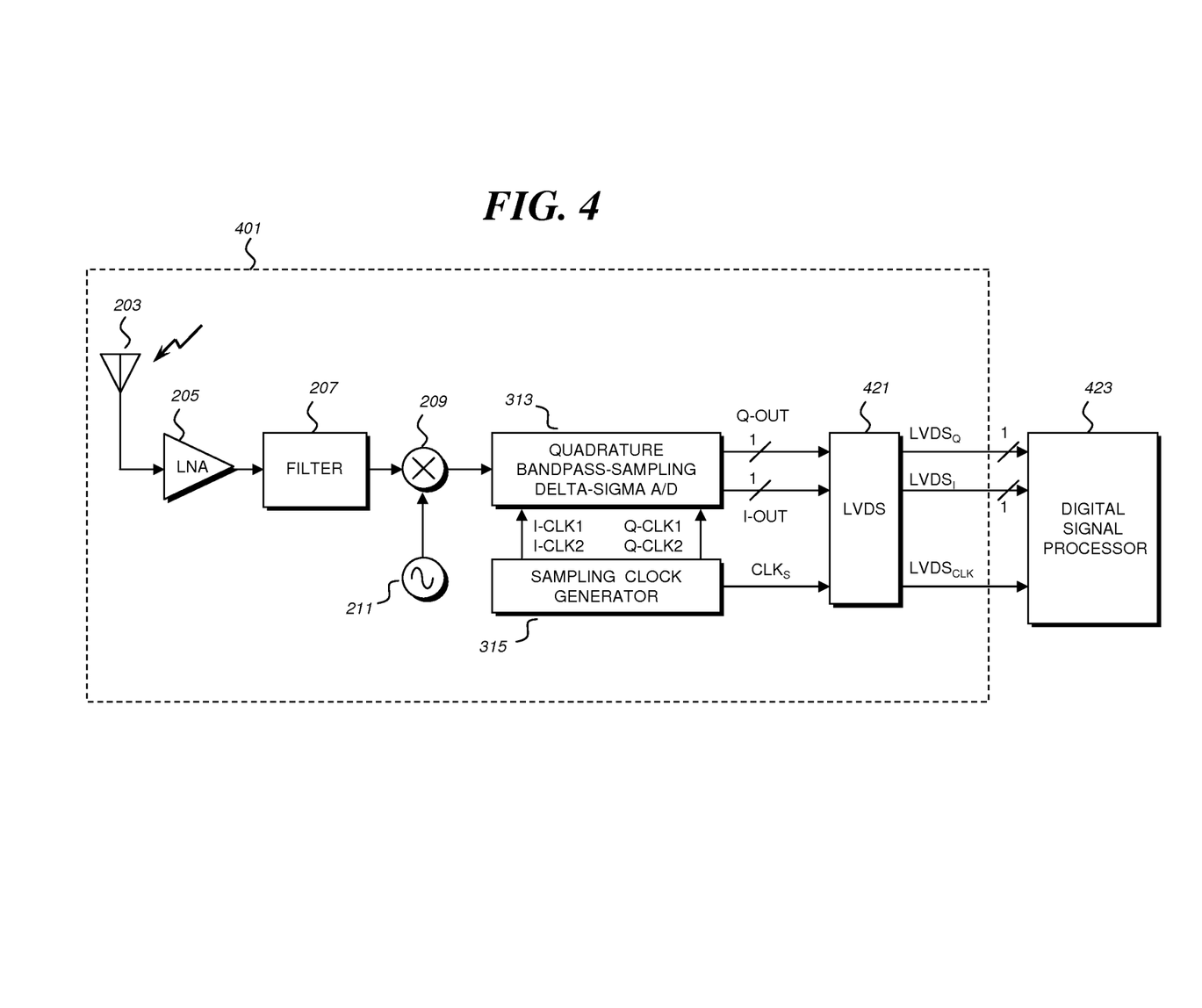
FIG. 4 is a schematic diagram illustrating an exemplary quadrature bandpass-sampling RF receiver interfacing with a digital signal processor according to disclosed embodiments.

FIG. 4 is a schematic diagram illustrating further an exemplary wide-frequency band quadrature bandpass-sampling RF receiver 401, which interfaces a digital signal processor (DSP) 423. As shown in FIG. 4, the receiver 401 comprises an LNA 205, a filter 207, a mixer 209, a local oscillator 211, a QBS-ADD 313, a sampling clock generator 315, and a low-voltage differential signaling (LVDS) 421. The bit streams I-OUT and Q-OUT are clocked at very high sampling rate, e.g., between 1 GHz to 4 GHz, as mentioned previously. Consequently, usage of a LVDS is a preferred approach to send high-frequency digital signals across a PCB for reception at the DSP 423 without losing signal integrity. The sampling clock, $CLK_S$, is also sent to the DSP 423 for latching the digital bits I-OUT and Q-OUT correctly.

Figure 5:
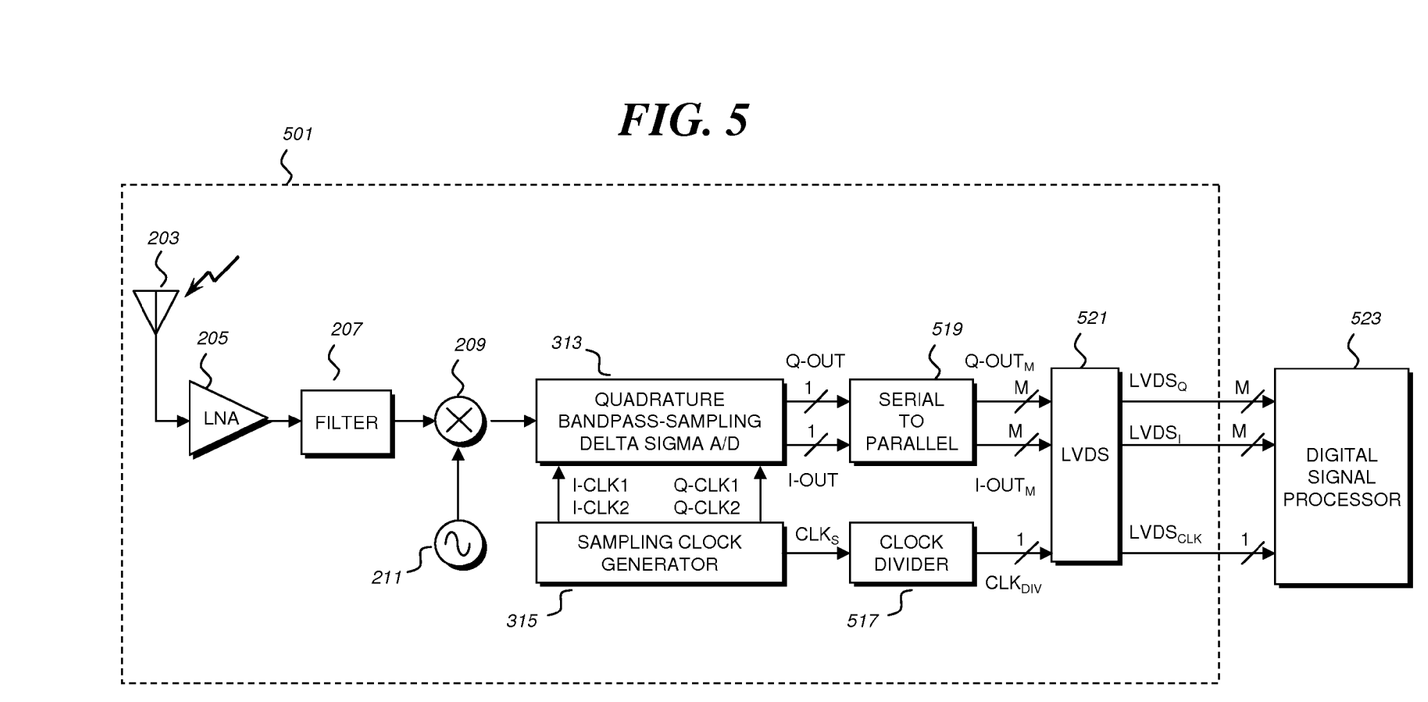
FIG. 5 is a schematic diagram illustrating an alternative exemplary quadrature bandpass-sampling RF receiver interfacing with a digital signal processor according to other disclosed embodiments.

FIG. 5 is a schematic diagram illustrating an alternative exemplary wide-frequency band quadrature bandpass-sampling RF receiver 501, which interfaces a digital signal processor (DSP) 523. As shown in FIG. 5, the receiver 501 comprises an LNA 205, a filter 207, a mixer 209, a local oscillator 211, a QBS-ADD 313, a sampling clock generator 315, a serial-to-parallel converter 519, a clock divider 517, and an LVDS 521. Using an LVDS at frequencies exceeding a 1 GHz data rate is not suitable for low-cost DSP processors. Therefore, the data rate must be scaled down. The serial-to-parallel converter 519 is used to scale the data rate down by a factor of M and parallelize the serial I-OUT into M parallel bits $I\text{-}OUT_M$, and the serial Q-OUT into M parallel bits $Q\text{-}OUT_M$. Paralleling the signals I-OUT and Q-OUT by a factor of M reduces the data rate by the same factor. The sampling clock $CLK_S$ is also divided down by M to $CLK_{DIV}$, before sending out to the DSP 523 via the LVDS block 521.

Figure 6:
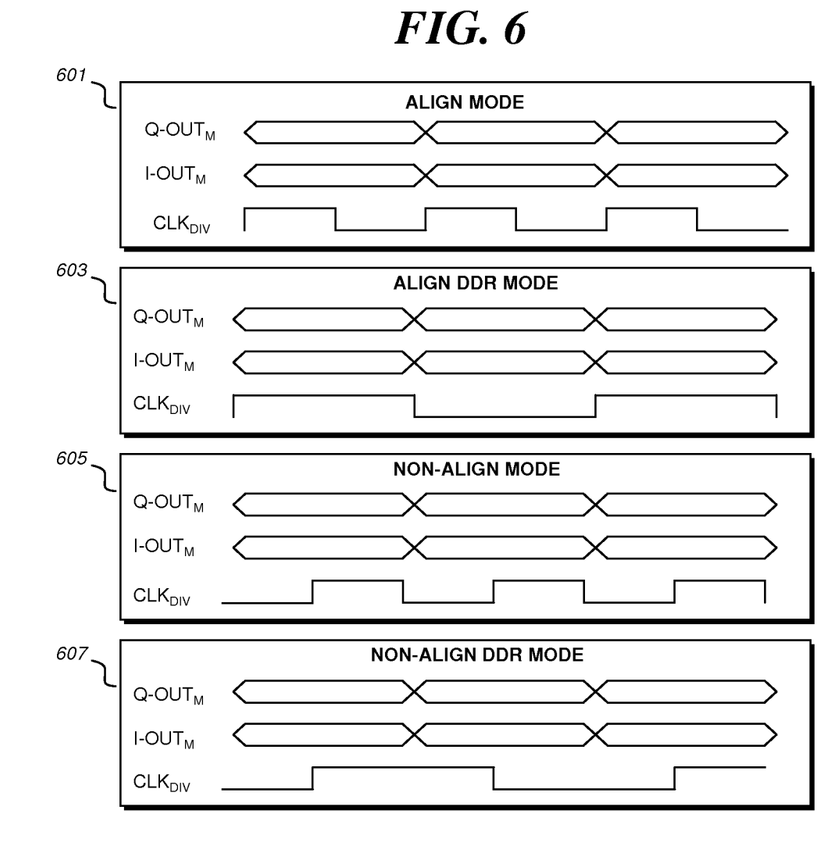
FIG. 6 is a timing diagram illustrating data output modes interfacing with a digital signal processor according to disclosed embodiments.

FIG. 6 illustrates various modes for sending out the data to the DSP 523 of FIG. 5, including an align mode 601, an align double-data-rate (DDR) mode 603, a non-align mode 605, and a non-align DDR mode 607. In the align mode 601, the rising edge of the sampling clock $CLK_{DIV}$ coincides with the transition edge of the data. Also, the data width is equal to the period of the sampling clock $CLK_{DIV}$. In the align DDR mode 603, transition edges of the sampling clock $CLK_{DIV}$ coincide with the transition edge of the data, but the data width is equal to half the period of the sampling clock $CLK_{DIV}$. In the non-align mode 605, the falling edge of the sampling clock $CLK_{DIV}$, coincides with the transition edge of the data, and the data width is equal to the period of the sampling clock $CLK_{DIV}$. In the non-align DDR mode 607, the transition edges of the sampling clock $CLK_{DIV}$ occur halfway between the transition edges of the data, and the data width is equal to half of the period of the sampling clock $CLK_{DIV}$.

It should be noted that the term communication unit may be used herein to denote a wired device, for example a high speed modem, an xDSL type modem, a fiber optic transmission device, and the like, and a wireless device, and typically a wireless device that may be used with a public network, for example in accordance with a service agreement, or within a private network such as an enterprise network or an ad hoc network. Examples of such communication devices include a cellular handset or device, television apparatus, personal digital assistants, personal assignment pads, and personal computers equipped for wireless operation, and the like, or equivalents thereof, provided such devices are arranged and constructed for operation in connection with wired or wireless communication.

The communication units of particular interest are those providing or facilitating voice communications services or data or messaging services normally referred to as ultra wideband networks, cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks, LTE (Long Term Evolution) networks, and variants or evolutions thereof.

Furthermore, the wireless communication devices of interest may have short range wireless communications capability normally referred to as WLAN (wireless local area network) capabilities, such as IEEE 802.11, Bluetooth, WPAN (wireless personal area network) or Hyper-Lan and the like using, for example, CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A circuit for demodulating and digitizing an RF signal over a wide-frequency band, comprising:
   an antenna configured to produce an RF signal;
   a low-noise amplifier (LNA) configured to receive the RF signal to produce an amplified RF signal;
   a filter, responsive to the LNA, configured to remove an image frequency of the amplified RF signal, thereby generating a filtered RF signal;
   a first local oscillator configured to generate a first mixing signal having a first mixing frequency;
   a first mixer configured to frequency-shift the filtered RF signal based on the first mixing frequency, thereby producing a frequency-shifted RF signal located at an intermediate frequency;
   a sampling clock generator configured to generate a first sampling clock, a first in-phase sampling clock, a first quadrature sampling clock, a second in-phase sampling clock, and a second quadrature sampling clock;

a first summer configured to generate a first error signal by subtracting a first up-converting quadrature analog signal and a first up-converting in-phase analog signal from the frequency-shifted signal;

a first resonator configured to receive the first error signal and to generate an amplified first error signal;

a second summer configured to generate a second error signal by subtracting a second up-converting quadrature analog signal and a second up-converting in-phase analog signal from the amplified first error signal;

a second resonator configured to receive the second error signal, and to generate an amplified second error signal;

a second local oscillator configured to generate a second mixing signal having a second mixing frequency;

a second mixer configured to frequency-shift the amplified second error signal based on the second mixing frequency to generate a frequency-shifted error signal;

a third summer configured to generate a third error signal by subtracting a third up-converting quadrature analog signal and a third up-converting in-phase analog signal from the frequency-shifted error signal;

a third resonator configured to receive the third error signal, and to generate an amplified third error signal;

a fourth summer configured to generate a fourth error signal by subtracting a fourth up-converting quadrature analog signal and a fourth up-converting in-phase analog signal from the amplified third error signal;

a fourth resonator configured to receive the fourth error signal, and to generate an amplified fourth error signal;

a quadrature quantizer configured to sample the amplified fourth error signal based on the first quadrature sampling clock, and to generate a quadrature digital signal;

an in-phase quantizer configured to sample the amplified fourth error signal based on the first in-phase sampling clock and to generate an in-phase digital signal;

a first quadrature digital mixer configured to frequency-shift the quadrature digital signal based on the first quadrature sampling clock to generate a first up-converting quadrature digital signal;

a first in-phase digital mixer configured to frequency-shift the in-phase digital signal based on the first in-phase sampling clock to generate a first up-converting in-phase digital signal;

a second quadrature digital mixer configured to frequency-shift the quadrature digital signal based on the second quadrature sampling clock to generate a second up-converting quadrature digital signal;

a second in-phase digital mixer configured to frequency-shift the in-phase digital signal based on the second in-phase sampling clock to generate a second up-converting in-phase digital signal;

a first quadrature D/A configured to generate the first up-converting quadrature analog signal, responsive to the second up-converting quadrature digital signal;

a second quadrature D/A configured to generate the second up-converting quadrature analog signal, responsive to the second up-converting quadrature digital signal;

a third quadrature D/A configured to generate the third up-converting quadrature analog signal, responsive to the first up-converting quadrature digital signal;

a fourth quadrature D/A configured to generate the fourth up-converting quadrature analog signal, responsive to the first up-converting quadrature digital signal;

a first in-phase D/A configured to generate the first up-converting in-phase analog signal, responsive to the second up-converting in-phase digital signal;

a second in-phase D/A configured to generate the second up-converting in-phase analog signal, responsive to the second up-converting in-phase digital signal;

a third in-phase D/A configured to generate the third up-converting in-phase analog signal, responsive to the first up-converting in-phase digital signal;

a fourth in-phase D/A configured to generate the fourth up-converting in-phase analog signal, responsive to the first up-converting in-phase digital signal; and an interface circuit configured to
generate a plurality of in-phase low-voltage differential signaling (LVDS) signals responsive to the in-phase digital signal,
generate a plurality of quadrature LVDS signals responsive to the quadrature digital signal, and
generate an LVDS clock responsive to the first sampling clock.

2. The circuit of claim 1, wherein the LNA is a wide band amplifier covering frequencies from 400 MHz to 6 GHz.

3. The circuit of claim 1, wherein
the filter is a low-pass filter, and
a frequency of the RF signal is below the intermediate frequency.

4. The circuit of claim 1, wherein
the filter is a high-pass filter, and
a frequency of the RF signal is higher than the intermediate frequency.

5. The circuit of claim 1, wherein
the intermediate frequency is between 1 GHz and 4 GHz; and
the first mixing frequency is equal to the difference between the RF signal frequency and the intermediate frequency.

6. The circuit of claim 1, wherein
the first quadrature sampling clock is ninety degree out of phase with the first in-phase sampling clock,
the second quadrature sampling clock is ninety degree out of phase with the second in-phase sampling clock,
a first clock frequency of the first in-phase sampling clock and the first quadrature sampling clock is equal to a sampling clock frequency of the first sampling clock, and
a second clock frequency of the second in-phase sampling clock and the second quadrature sampling clock is equal to the intermediate frequency.

7. The circuit of claim 1, wherein a first resonant frequency of the first resonator and a second resonant frequency of the second resonator are both approximately equal to the intermediate frequency.

8. The circuit of claim 1, wherein
a third resonant frequency of the third resonator is approximately equal to a fourth resonant frequency of the fourth resonator,
the third resonant frequency and the fourth resonant frequency are both half of the intermediate frequency, and
a first clock frequency of the first in-phase sampling clock and the first quadrature sampling clock is half of the intermediate frequency.

9. The circuit of claim 1, wherein
a third resonant frequency of the third resonator is approximately equal to a fourth resonant frequency of the fourth resonator,
the third resonant frequency and the fourth resonant frequency are both twice the intermediate frequency, and a first clock frequency of the first in-phase sampling clock and the first quadrature sampling clock is twice the intermediate frequency.

10. The circuit of claim 1, wherein the in-phase digital signal and quadrature digital signal are both bi-level signals.

11. The circuit of claim 1, wherein the interface circuit further comprises:
a serial-to-parallel converter configured
to capture M consecutive in-phase digital signals from the in-phase quantizer to produce M parallel in-phase digital signals, and
to capture M consecutive quadrature digital signals from the quadrature quantizer to produce M parallel quadrature digital signals;
a clock divider configured to divide the first sampling clock by M to generate a divide-by-M clock;
an LVDS interface circuit configured
to receive the M parallel in-phase digital signals to generate M parallel in-phase LVDS signals,
to receive the M parallel quadrature digital signals to generate M parallel quadrature LVDS signal, and
to receive the divide-by-M clock to generate an LVDS clock.

12. The circuit of claim 11, wherein
a period of the in-phase LVDS signal is equal to a period of the LVDS clock,
a period of the quadrature LVDS signal is equal to the period of the LVDS clock, and
a rising edge of the LVDS clock coincides with transition edges of the in-phase LVDS signals and the quadrature LVDS signals.

13. The circuit of claim 11, wherein
a period of the in-phase LVDS signal is equal to half a period of the LVDS clock,
a period of the quadrature LVDS signal is equal to half the period of the LVDS clock, and
rising and falling edges of the LVDS clock coincide with transition edges of the in-phase LVDS signal and the quadrature LVDS signal.

14. The circuit of claim 11, wherein
a period of the in-phase LVDS signal is equal to a period of the LVDS clock,
a period of the quadrature LVDS signal is equal to the period of the LVDS clock, and
a falling edge of the LVDS clock coincides with transition edges of the in-phase LVDS signal and the quadrature LVDS signal.

15. The circuit of claim 11, wherein
a period of the in-phase LVDS signal is equal to half a period of the LVDS clock,
a period of the quadrature LVDS signal is equal to half the period of the LVDS clock, and
transition edges of the LVDS clock are midway between transition edges of the in-phase LVDS signals and the quadrature LVDS signals.

16. A method for demodulating and digitizing an RF signal over a wide-frequency band comprising:
receiving an RF signal from the air through the antenna;
amplifying the RF signal to generate an amplified RF signal;
filtering the amplified RF signal to remove an image frequency of the amplified RF signal, thereby generating a filtered RF signal;
generating a first mixing signal having a first mixing frequency;
frequency-shifting the filtered RF signal based on the first mixing signal, thereby producing a frequency-shifted RF signal located at an intermediate frequency;
generating a first sampling clock signal, a first in-phase sampling clock signal, a first quadrature sampling clock signal, a second in-phase sampling clock signal, and a second quadrature sampling clock signal;
generating a first error signal by subtracting a first up-converting quadrature analog signal and a first up-converting in-phase analog signal from the frequency-shifted signal;
generating an amplified first error signal in response to the first error signal;
generating a second error signal by subtracting a second up-converting quadrature analog signal and a second up-converting in-phase analog signal from the amplified first error signal;
generating an amplified second error signal in response to the second error signal;
generating a second mixing signal having a second mixing frequency;
frequency-shifting the amplified second error signal based on the second mixing frequency, thereby generating a frequency-shifted error signal;
generating a third error signal by subtracting a third up-converting quadrature analog signal and a third up-converting in-phase analog signal from the frequency-shifted error signal;
generating an amplified third error signal in response to the third error signal;
generating a fourth error signal by subtracting a fourth up-converting quadrature analog signal and a fourth up-converting in-phase analog signal from the amplified third error signal;
generating an amplified fourth error signal in response to the fourth error signal;
sampling the amplified fourth error signal based on the first quadrature sampling clock signal, thereby generating a quadrature digital signal;
sampling the amplified fourth error signal based on the first in-phase sampling clock signal, thereby generating an in-phase digital signal;
frequency-shifting the quadrature digital signal based on the first quadrature sampling clock signal to generate a first up-converting quadrature digital signal;
frequency-shifting the in-phase digital signal based on the first in-phase sampling clock signal to generate a first up-converting in-phase digital signal;
frequency-shifting the quadrature digital signal based on the second quadrature sampling clock signal and generating a second up-converting quadrature digital signal;
frequency-shifting the in-phase digital signal based on the second in-phase sampling clock signal and generating a second up-converting in-phase digital signal;
producing the first up-converting quadrature analog signal, responsive to the second up-converting quadrature digital signal;
producing the second up-converting quadrature analog signal, responsive to the second up-converting quadrature digital signal;
producing the third up-converting quadrature analog signal, responsive to the first up-converting quadrature digital signal;
producing the fourth up-converting quadrature analog signal, responsive to the first up-converting quadrature digital signal;

producing the first up-converting in-phase analog signal, responsive to the second up-converting in-phase digital signal;
producing the second up-converting in-phase analog signal, responsive to the second up-converting in-phase digital signal;
producing the third up-converting in-phase analog signal, responsive to the first up-converting in-phase digital signal;
producing the fourth up-converting in-phase analog signal, responsive to the first up-converting in-phase digital signal;
generating a plurality of in-phase low-voltage differential signaling (LVDS) signals responsive to the in-phase digital signal;
generating a plurality of quadrature LVDS signals responsive to the quadrature digital signal;
generating an LVDS clock signal responsive to the first sampling clock signal.

17. The method of claim 16, wherein the amplifying of the RF signal covers frequencies from 400 MHz to 6 GHz.

18. The method of claim 16, wherein
the filtering of the amplified RF signal is low-pass filtering, and
a frequency of the RF signal is below the intermediate frequency.

19. The method of claim 16, wherein
the filtering of the amplified RF signal is high-pass filtering, and
a frequency of the RF signal is higher than the intermediate frequency.

20. The method of claim 16, wherein
the intermediate frequency is between 1 GHz and 4 GHz; and
the first mixing frequency is equal to the difference between the RF signal frequency and the intermediate frequency.

21. The method of claim 16, wherein
the first quadrature sampling clock is ninety degree out of phase with the first in-phase sampling clock and the first quadrature sampling clock are ninety degree out of phase,
the second quadrature sampling clock is ninety degree out of phase with the second in-phase sampling clock,
a first clock frequency of the first in-phase sampling clock and the first quadrature sampling clock is equal to a sampling clock frequency of the first sampling clock, and
a second clock frequency of the second in-phase sampling clock and the second quadrature sampling clock is equal to the intermediate frequency.

22. The method of claim 16, wherein
the generating of the amplified first error signal is in response to the first error signal and a first resonant frequency;
the generating of the amplified second error signal is in response to the second error signal and a second resonant frequency;
the generating of the amplified third error signal is in response to the third error signal and a third resonant frequency; and
the generating of the amplified fourth error signal is in response to the fourth error signal and a fourth resonant frequency.

23. The method of claim 22, wherein the first resonant frequency and the second resonant frequency are both approximately equal to the intermediate frequency.

24. The method of claim 22, wherein
the third resonant frequency is approximately equal the fourth resonant frequency,
the third resonant frequency and the fourth resonant frequency are both half of the intermediate frequency,
a first clock frequency of the first in-phase sampling clock signal and the first quadrature sampling clock signal is half of the intermediate frequency.

25. The method of claim 22, wherein
the third resonant frequency is approximately equal the fourth resonant frequency,
the third resonant frequency and the fourth resonant frequency are both twice the intermediate frequency,
a first clock frequency of the first in-phase sampling clock signal and the first quadrature sampling clock signal is twice the intermediate frequency.

26. The method of claim 16, wherein the in-phase digital signal and quadrature digital signal are both bi-level signals.

27. The method of claim 16, wherein the interface circuit further comprises:
capturing M consecutive in-phase digital signals to produce M parallel in-phase digital signals;
capturing M consecutive quadrature digital signals to produce M parallel quadrature digital signals;
dividing the first sampling clock signal by M to generate a divide-by-M clock signal;
generating M parallel in-phase LVDS signals based on the M parallel in-phase digital signals;
generating M parallel quadrature LVDS signal the M parallel quadrature digital signals; and
generating an LVDS clock signal based on the divide-by-M clock signal.

28. The method of claim 27, wherein
a period of the in-phase LVDS signal is equal to a period of the LVDS clock signal,
a period of the quadrature LVDS signal is equal to the period of the LVDS clock signal, and
a rising edge of the LVDS clock signal coincides with transition edges of the in-phase LVDS signals and the quadrature LVDS signals.

29. The method of claim 27, wherein
a period of the in-phase LVDS signal is equal to half a period of the LVDS clock signal,
a period of the quadrature LVDS signal is equal to half the period of the LVDS clock signal, and
rising and falling edges of the LVDS clock signal coincide with transition edges of the in-phase LVDS signal and the quadrature LVDS signal.

30. The method of claim 27, wherein
a period of the in-phase LVDS signal is equal to a period of the LVDS clock signal,
a period of the quadrature LVDS signal is equal to the period of the LVDS clock signal, and
a falling edge of the LVDS clock signal coincides with transition edges of the in-phase LVDS signal and the quadrature LVDS signal.

31. The method of claim 27, wherein
a period of the in-phase LVDS signal is equal to half a period of the LVDS clock signal,
a period of the quadrature LVDS signal is equal to half the period of the LVDS clock signal, and
transition edges of the LVDS clock signal are midway between transition edges of the in-phase LVDS signals and the quadrature LVDS signals.

* * * * *